United States Patent Office 3,824,257
Patented July 16, 1974

---

3,824,257
STABILIZATION OF α,α-DISUBSTITUTED-β-PROPIOLACTONES
Windell C. Watkins, Longview, Tex., assignor to Eastman Kodak Company, Rochester, N.Y.
No Drawing. Filed Dec. 2, 1971, Ser. No. 204,294
Int. Cl. C07d 3/00
U.S. Cl. 260—343.9
8 Claims

ABSTRACT OF THE DISCLOSURE

α,α-Disubstituted-β-propiolactones having the general formula:

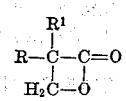

wherein R and R$^1$ are selected from the group consisting of hydrogen, straight- or branched-chain alkyl groups of from 1 to 10 carbon atoms, substituted or unsubstituted cyclic hydrocarbon groups of from 6 to 10 carbon atoms, or wherein R and R$^1$ join to form a ring of from 6 to 10 carbon atoms, are effectively stabilized against premature polymerization under extreme conditions such as, for example, high temperatures, by including in admixture therewith a stabilizing amount of a borate ester having the general formula:

$$(R^2O)_3B$$

wherein each R$^2$ is selected from the group consisting of a straight- or branched-chain alkyl group of from 1 to 8 carbon atoms, a substituted or unsubstituted benzyl group, or a substituted or unsubstituted phenyl group.

---

This invention relates to the stabilization of β-lactones. More particularly, this invention relates to the prevention of premature polymerization of β-lactones such as, for example, α,α-disubstituted - β - propiolactones, by incorporating therein a stabilizing amount of at least one selected ester of boric acid.

It is well known that β-lactones are important as intermediates for the production of synthetic chemicals, polymer products, pharmaceuticals and the like. The α,α-disubstituted-β-propiolactones are of particular interest in the high polymer industry since they can be used as starting materials for the production of synthetic resins and fibers which have many novel and desirable properties. However, for the lactones to be useful in the preparation of commercial polymers they must be of a very high purity and quality. In order to obtain this high purity and quality on a commercial scale, the lactones are normally distilled. Unfortunately, it has been found that α,α-disubstituted-β-propiolactones are very difficult to purify in this manner since they readily polymerize when heated, thereby plugging the distillation equipment. In addition, these lactones also polymerize when subjected to the action of even trace amounts of a catalytic material. Therefore, as a result of their thermal and catalytic sensitivity, α,α-disubstituted-β-propiolactones cannot be readily purified by normal distillation techniques, handled in a conventional manner or stored in containers normally employed for polymer precursors.

In an effort to eliminate or at least reduce these purification, handling and storage problems, it has been proposed that acidic materials be added to α,α-disubstituted-β-propiolactones as polymerization stabilizers or inhibitors. Examples of such acidic stabilizer materials include acidic phenols, aromatic sulfonic acids, α-halocarboxylic acids, boron trihalide-Lewis base addition compounds, aryldiazonium fluoroacid salts and the like. Although these acidic stabilizer materials are reasonably effective as polymerization inhibitors for lactones, they still leave much to be desired. For example, such acidic materials often adversely affect the quality of the lactones, are difficult to remove from the lactones and require special handling procedures. Thus, in view of these and other short-comings of the stabilizer materials heretofore proposed, a need exists for an effective material which will prevent the premature polymerization of α,α-disubstituted-β-propiolactones.

Therefore, it is an object of this invention to provide a stabilizer system for β-lactones.

Another object of this invention is to provide a stabilizer system for α,α-disubstituted-β-propiolactones which will prevent their polymerization under extreme conditions including the high temperatures associated with purification by distillation.

Yet another object of this invention is to provide a stabilizer system for α,α-disubstituted-β-propiolactones which can be used to prevent their premature polymerization, yet may be removed from the lactones without adversely affecting their quality.

These and other objects and advantages of this invention will become apparent from the following description and appended claims.

In accordance with this invention, it has been found that β-lactones, and especially α,α-disubstituted-β-propiolactones having the general formula

wherein R and R$^1$ are selected from the group consisting of hydrogen, straight- or branched-chain alkyl groups of from 1 to 10 carbon atoms (i.e., methyl, ethyl, propyl, isopropyl, n-butyl, isobutyl, etc.), substituted or unsubstituted cyclic hydrocarbon groups of from 6 to 10 carbon atoms (i.e., cyclohexyl, benzyl, phenyl, naphthylene, etc.), or wherein R and R$^1$ join to form a ring of from 6 to 10 carbon atoms (i.e., a radical having the formula —CH$_2$(CH$_2$)$_n$CH$_2$— wherein $n$ is a positive integer of from 3 to 7, —CH=CH(CH$_2$)$_2$CH$_2$—, or the like), can be effectively stabilized against polymerization under extreme conditions by including an admixture therewith a stabilizing amount of an ester having the general formula:

$$(R^2O)_3B$$

wherein each R$^2$ is:
(1) a straight or branched chain alkyl group of from 1 to 8 carbon atoms;
(2) a substituted or unsubstituted benzyl group having the formula

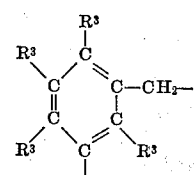

wherein each R$^3$ is hydrogen, or a straight or branched chain alkyl group of from 1 to 8 carbon atoms; and/or
(3) a substituted or unsubstituted phenyl group having the formula

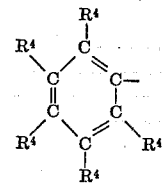

wherein each R$^4$ is hydrogen or a straight or branched chain alkyl group of from 1 to 8 carbon atoms.

These esters of boric acid can be added to the lactones by any suitable method at any time prior to the lactones being subjected to polymerization conditions and have been found to be effective in concentrations as low as 0.001 percent by weight. Normally, the concentration of the borate stabilizers falls within the range of from about 0.001 to about 5.0 percent by weight, and preferably between about 0.001 to about 0.5 percent. Concentrations of over 5 percent by weight of the borate stabilizers may be used, but no particular advantage is to be gained by the use of such large amounts.

Suitable $\alpha,\alpha$-disubstituted-$\beta$-propiolactones that can be stabilized against premature polymerization in accordance with the invention include $\beta$-propiolactone, $\alpha,\alpha$-dimethyl-$\beta$-propiolactone (pivalolactone), $\alpha,\alpha$-diethyl-$\beta$-propiolactone, $\alpha,\alpha$-dipropyl-$\beta$-propoiolactone, $\alpha,\alpha$-diisopropyl-$\beta$-propiolactone, $\alpha,\alpha$-dibutyl-$\beta$-propiolactone, 2-ethyl-2-methylhydracrylic acid $\beta$-lactone, 2-(2,2-dimethyloctyl)-2-methylhydracrylic acid $\beta$-lactone, 2-(2-ethylhexyl)-2-ethylhydracrylic acid $\beta$-lactone, 2-cyclohexyl-2-propylhydracrylic acid $\beta$-lactone, 2-phenyl-2-methylhydracrylic acid $\beta$-lactone, 2-benzyl-2-methylhydracrylic acid $\beta$-lactone, 2,2-pentamethylene-$\beta$-propiolactone, and the like.

Suitable esters of boric acid which may be used to stabilize these $\alpha,\alpha$-disubstituted-$\beta$-propiolactones include tri(methyl)borate, tri(ethyl)borate, tri(butyl)borate, tri(isobutyl)borate, tri(amyl)borate, tri(hexyl)borate, tri-(2-methylhexyl)borate, tri(2-ethylhexylborate, tribenzylborate, triphenylborate, dimethylethylborate, dibutylamylborate, and the like. Although any of these borate esters will effectively stabilize the lactones against polymerization, in certain instances where the stabilizer material is to be removed from the $\beta$-lactone it is desirable to select one which has a relatively high boiling point in reference to the lactone to be stabilized such as, for example, tri-(2-ethylhexy)borate. These high boiling esters of boric acid can be effectively removed from the stabilized $\alpha,\alpha$-disubstituted-$\beta$-propiolactones by a number of methods such as, for example, by flash distilling the stabilized lactone through a packed distilling column or by treating the chilled stabilized lactone with a cold, dilute solution of a bicarbonate such as sodium bicarbonate in water, separating the lactone layer and drying it over anhydrous magnesium sulfate. The thus obtained $\alpha,\alpha$-disubstituted-$\beta$-propiolactone is of high purity and can be used directly as an intermediate for the preparation of other monomeric compounds (e.g., esters, acids, etc.), or polymerized to high molecular weight polymers in the presence of suitable catalysts such as aliphatic, alicyclic and aromatic amines.

This invention will be further illustrated by the following examples of preferred embodiments, although it will be understood that these examples are included merely for purposes of illustration and are not intended to limit the scope of the invention.

EXAMPLE 1

This example shows the stabilizing effect of various amounts of tri(2-ethylhexyl)borate on pivalolactone. Pivalolactone is mixed with a weighed amount of tri(2-ethylhexyl)borate and the polymerization time determined. The results obtained using various amounts of inhibitor are tabulated below:

TABLE I

| Weight Percent Tri-(2-ethylhexyl)borate | Polymerization Time, seconds |
| --- | --- |
| None | 7.5. |
| 0.001 | 15. |
| 0.05 | 25. |
| 0.1 | 55. |
| 0.2 | 65. |
| 0.5 | 95. |
| 1.0 | 120. |
| 5.0 | Will not polymerize. |
| 10.0 | Do. |

The polymerization time of the lactone monomer given in Table I and as used hereinafter is determined by mixing 10 grams of the lactone with 0.5 ml. of a 0.1 molar acetone solution of tetrabutylammonium iodide, which acts as a polymerization catalyst, in an aluminum dish. The mixture is then heated on a steam bath until polymerization starts as evidenced by the first visual indication of a congealing of the lactone. The heating time in seconds required for the initial visual appearance of polymer in the dish is defined as polymerization time.

EXAMPLE 2

The stabilizing effect of tri(isobutyl)borate on pivalolactone is shown in this example. Pivalolactone is mixed with a weighed amount of tri(isobutyl)borate and the polymerization time determined. The results obtained with various amounts of inhibitor art tabulated below:

TABLE II

| Weight Percent Tri-(isobutyl)borate: | Polymerization Time, seconds |
| --- | --- |
| None | 8 |
| 0.1 | 59 |
| 0.2 | 74 |

EXAMPLE 3

This example shows the thermal instability of high quality pivalolactone even when it is blanketed with an inert gas. Pivalolactone (150 grams, polymerization time—7.5 seconds) is heated to 85° C. under nitrogen and kept at this temperature for 24 hours. At the end of the 24-hour heating period the pivalolactone has completely polymerized and no monomeric pivalolactone can be recovered.

EXAMPLE 4

This example shows that the presence of tri(2-ethylhexyl)borate makes high quality pivalolactone thermally stable and recoverable. Pivalolactone (150.0 grams, polymerization time—7.5 seconds) is mixed with 0.15 grams tri(2-ethylhexyl)borate and the mixture heated to 85° C. under nitrogen and kept at this temperature for 72 hours. The mixture is then distilled through an 8-inch Vigreux column under reduced pressure (b. p. 43° C./10 mm.). There is obtained 142.4 grams (95 percent) of pivalolactone with a polymerization time of 10 seconds. The residue after distillation is liquid with no sign of polymer. The percent pivalolactone recovered indicates the amount of lactone lost to polymer formation during the distillation process. As will be apparent, under ideal conditions no lactone would be lost during the distillation process and thus the amount recovered would be 100 percent.

EXAMPLE 5

This example shows that the borate esters of this invention stabilize high quality pivalolactone during distillation and that the quality of the distillate is substantially equal to or better than the quality of the staring monomer. To 150.0 grams pivalolacone (polymerization time—7.5 seconds) is added 0.15 gram tri(2-ethylhexy) borate and the mixture distilled through an 8-inch Vigreux column under reduced pressure (b.p. 43° C./10 mm.). There is obtained 149.0 grams (99.3 percent) of pivalolactone with a polymerization time of 6.5 seconds. The residue in the distilling flask is liquid with no appearance of polymer.

EXAMPLE 6

The low thermal stability of low quality pivalolactone, even when maintained under a blanket of inert gas, is shown in this example. Pivalolactone (150.0 grams, polymerization time—90 seconds) is heated to 85° C.

under nitrogen and kept at this temperature for 48 hours. At the end of this period of time the pivalolactone has polymerized and no monomeric pivalolactone can be recovered.

EXAMPLE 7

The stabilizing effect of tri(2-ethylhexyl)borate on low quality pivalolactone is shown in this example. Tri(2-ethylhexyl)borate (0.15 gram) is added to 150.0 grams pivalolactone (polymerization time—90 seconds) and the mixture heated to 85° C. under nitrogen. These conditions are maintained for 72 hours after which the pivalolactone is distilled through an 8-inch Vigreux column at reduced pressure (b.p. 43° C./10 mm.). There is obtained 146.8 grams (98 percent) of pivalolactone with a polymerization time of 105 seconds. The residue from the distillation is liquid with no polymer present.

EXAMPLE 8

This example shows that low quality pivalolactone can be effectively stabilized using the borate esters of this invention and that polymerization is inhibited during distillation by the presence of these esters. To 150 grams pivalolactone (polymerization time—90 seconds) is added 0.15 gram tri(2-ethylhexyl)borate and the mixture is distilled through an 8-inch Vigreux column under reduced pressure (b.p. 43° C./10 mm.). There is obtained 148.4 grams (98.4 percent) of pivalolactone which has a polymerization time of 90 seconds. The residue in the distilling flask is liquid with no appearance of polymer.

EXAMPLE 9

The stabilizing effect of tri(2-ethylhexyl)borate on $\alpha,\alpha$-diethyl-$\beta$-propiolactone is shown in this example. 150-Gram samples of $\alpha,\alpha$-diethyl-$\beta$-propiolactone is mixed with the various weight percent of tri(2-ethylhexyl)borate indicated in Table III below and the polymerization time is determined. The results obtained with the various amounts of stabilizer are as follows:

TABLE III

| Weight Percent Tri(2-ethylhexyl)borate: | Polymerization Time, seconds |
|---|---|
| None | 16 |
| 0.1 | 62 |
| 0.2 | 79 |
| 0.5 | 107 |

EXAMPLE 10

The stabilizing effect of tri(n-hexyl)borate on 2-ethyl-2-methylhydracrylic acid $\beta$-lactone is shown in this example. 2-Ethyl-2-methylhydracrylic acid $\beta$-lactone is mixed with the various weight percents of tri(n-hexyl)borate indicated in Table IV below and the polymerization time is determined. The results obtained with various amounts of inhibitor are as follows:

TABLE IV

| Weight Percent Tri(n-hexyl)borate: | Polymerization Time, seconds |
|---|---|
| None | 23 |
| 0.1 | 61 |
| 0.2 | 78 |
| 0.5 | 325 |

EXAMPLE 11

The stabilizing effect of various borate esters on pivalolactone is shown in this example. Pivalolactone is mixed with the weighed amount of inhibitor indicated in Table V below and the polymerization time is determined. The results obtained with various amounts of each inhibitor are as follows:

TABLE V

| Inhibitor | Weight percent | Polymerization time, seconds |
|---|---|---|
| None | | 17 |
| Tri(n-propyl)borate | 0.1 | 54 |
| | 0.2 | 95 |
| | 0.5 | 390 |
| Tri(n-hexyl)borate | 0.1 | 59 |
| | 0.2 | 69 |
| | 0.5 | 278 |
| Tribenzylborate | 0.1 | 72 |
| | 0.2 | 95 |
| | 0.5 | 405 |
| Triphenylborate | 0.1 | 49 |
| | 0.2 | 74 |
| | 0.5 | >1,080 |

As is shown by the above examples, the borate esters of this invention do not adversely affect the quality of the $\beta$-lactones when used as stabilizers to prevent their premature polymerization. In addition, these high boiling borate stabilizers can be removed from the $\beta$-lactones. Furthermore, the $\beta$-lactones contain no undesirable lower or higher boiling fractions thus indicating that the borate esters are not entering into side reactions.

The invention has been described in detail with particular reference to certain preferred embodiments thereof, but it will be understood that variations and modifications can be effected within the spirit and scope of the invention.

I claim:

1. A composition consisting essentially of an $\alpha,\alpha$-disubstituted-$\beta$-propiolactone having the formula

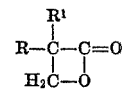

wherein each R and $R^1$ individually are hydrogen, straight or branched chain alkyl of from 1 to 10 carbon atoms and from about 0.001% to about 5.0%, based on the weight of the $\alpha,\alpha$-disubstituted-O-propiolactone monomer, of an ester having the formula

wherein each $R^2$ is selected from the group consisting of (1) straight or branched chain alkyl of from 1 to 8 carbon atoms;

(2) cyclic components having the formula:

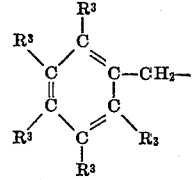

wherein each $R^3$ is hydrogen or a straight or branched chain alkyl of from 1 to 8 carbon atoms; and (3) cyclic components having the formula:

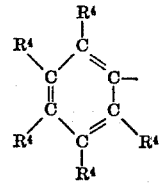

wherein each $R^4$ is hydrogen or a straight or branched chain alkyl of from 1 to 8 carbon atoms.

2. A composition according to Claim 1 wherein from about 0.001 to about 0.5 percent, based on the weight of the α,α-disubstituted-β-propiolactone, of the ester is present.

3. A composition according to Claim 1 wherein the α,α-disubstituted-β-propiolactone is pivalolactone.

4. A composition according to Claim 1 wherein the ester is tri(2-ethylhexyl)borate.

5. A composition according to Claim 4 wherein the α,α-disubstituted-β-propiolactone is pivalolactone.

6. A composition consisting essentially of pivalolactone having in admixture therein from about 0.01 to about 5.0 percent of tri(2-ethylhexyl)borate, based on the weight of the pivalolactone.

7. A composition according to Claim 1 wherein the ester is selected from the group consisting of tri(isobutyl)borate, tri(2-ethylhexyl)borate, tri(n-hexyl)borate, tri(n-propyl)borate, tribenzylborate, and triphenylborate.

8. A composition according to Claim 7 wherein the α,α-disubstituted-β-propiolactone is selected from the group consisting of pivalolactone, α,α-diethyl-β-propiolactone, and 2-ethyl-2-methylhydracrylic acid β-lactone.

References Cited
UNITED STATES PATENTS
3,488,122   6/1969   Klootwijk _____ 260—343.9

OTHER REFERENCES

Chemical Abstracts, vol. 62, 1965, 9311g relied on.

DONALD G. DAUS, Primary Examiner

A. M. T. TIGHE, Assistant Examiner